(No Model.)

E. HARTMANN & W. BRAUN.
ELECTRICAL MEASURING INSTRUMENT.

No. 537,343. Patented Apr. 9, 1895.

Witnesses:
L. D. Heinrichs
A. B. Digges

Inventors:
Eugen Hartmann,
Wunibald Braun,
by J. E. M. Bowen
Attorney

UNITED STATES PATENT OFFICE.

EUGEN HARTMANN AND WUNIBALD BRAUN, OF BOCKENHEIM, GERMANY.

ELECTRICAL MEASURING-INSTRUMENT.

SPECIFICATION forming part of Letters Patent No. 537,343, dated April 9, 1895.

Application filed November 27, 1891. Serial No. 413,162. (No model.) Patented in Switzerland July 15, 1891, No. 3,959; in England July 16, 1891, No. 12,117; in Belgium September 10, 1891, No. 72,644, and in Germany July 14, 1892, No. 63,219.

*To all whom it may concern:*

Be it known that we, EUGEN HARTMANN and WUNIBALD BRAUN, subjects of the Emperor of Germany, residing at Bockenheim, near Frankfort-on-the-Main, Germany, have invented new and useful Improvements in Electrical Measuring-Instruments, (for which we have obtained Letters Patent as follows: in Great Britain, No. 12,117, dated July 16, 1891; in Switzerland, No. 3,959, dated July 15, 1891; in Belgium, No. 72,644, dated September 10, 1891, and in Germany, No. 63,219, dated July 14, 1892,) of which the following is a specification.

The galvanometer or electrical measuring instrument to be described hereinafter has for its object to sum up the bendings produced in the heat-wires or connecting pieces, by the passage of the electric current, and thus to produce a large translation upon the axle of the indicator.

Figure 1:
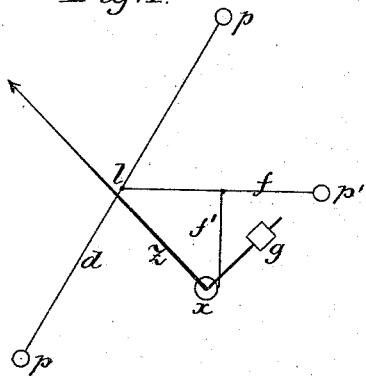
Figure 2:
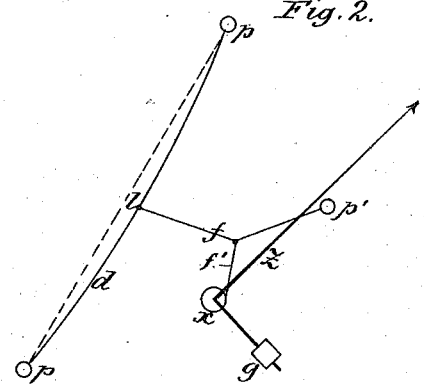
Figure 3:
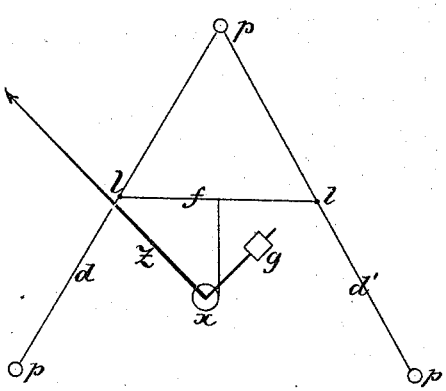
Figure 4:
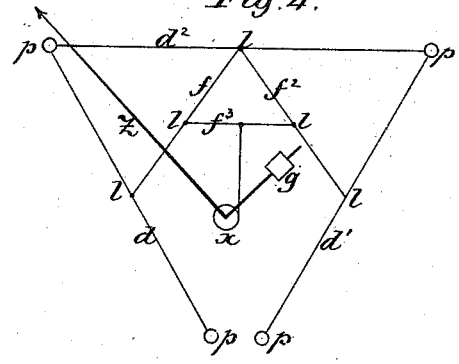
Figure 5:
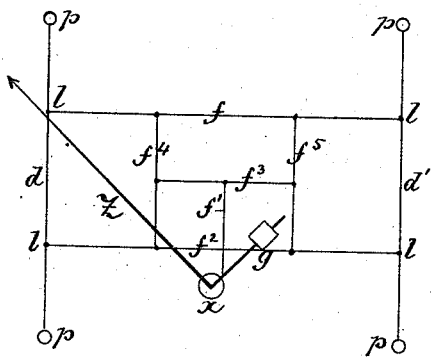
Figure 6:
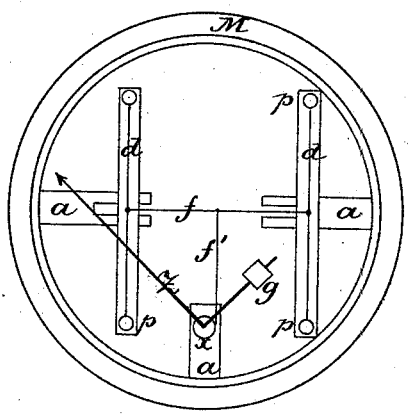

In the accompanying drawings forming part of this specification Figure 1 represents a diagrammatic view of an instrument embodying my invention. Fig. 2 represents a similar view showing the operation of the same when an electric current is passing through the heat wire. Figs. 3 and 4 show instruments arranged for two and three heat-wires respectively. Fig. 5 represents a modification of Fig. 3, and Fig. 6 illustrates the manner of mounting the several parts of the instrument.

The wire $d$ Fig. 1, through which the current to be measured passes, and the lengthening of which wire is to be a measure for the strength of the current, is held taut between two fixed supports $p$ $p$. The center of the wire is connected by an easily bending support or connection, for example, a thread $f$ to a fixed point $p'$, and from the center of the said thread $f$ another thread $f'$ is passed to the periphery of a small roll $x$ fixed on the indicator axle of the instrument. This indicator axle supports a small weight $g$, or is connected with a spring so that the heat-wire $d$ at all times remains taut. By the lengthening of the same the indicator axle is permitted to turn through the action of gravity or spring tension. To the indicator axle the indicator $Z$ is attached.

The apparatus operates in the following manner: When the current passes, the heat-wire $d$ is lengthened and bends downward as shown in Fig. 2. Thereby the distance $l.p'$. is decreased and a bending of the flexible support $f$ is produced which permits the weight connected to the indicator roll to turn the same and wind the thread thereon. As the bending of the heat-wire as well as that of the flexible support is large relatively to the lengthening of the heat-wire it is desirable to obtain more accurate indications to use a roll of correspondingly large diameter. A still greater translation is obtained if the bridge or flexible support $f$ instead of being connected with a fixed support $p'$ Fig. 1, is connected with the center of a second conductor $d'$ as appears in Figs. 3 and 5, arranged either parallel or at an angle to the first conductor so that the lengthening of both can operate to reduce the distance between the points of connection 11.

If three conductors $d$, $d'$ $d^2$ are used and the centers of the two bridges or flexible supports $f f^2$ Fig. 4 are connected by a flexible thread $f^3$ or if the conductors and threads are arranged as shown in Fig. 5 the translation can be increased considerably. In said Fig. 5 the heat-wires $d$, $d'$ are arranged parallel to each other, and are connected to each other by two parallel cords or threads $f f^2$, which in turn are connected to each other by parallel threads $f^4$ and $f^5$ connected together by thread $f^3$ from which latter the thread $f'$ passes to the roll $x$. In measuring a larger or stronger current several heat-wires can be switched into parallel arc with the measuring wire.

To make the instrument independent of the temperature of the surrounding air, the measuring wire $d$, Fig. 6 is mounted on a bar or terminal of the same material, which bar is screwed at its center to a zinc supporting rod $a$, which rod is fastened to a brass ring M. Furthermore the indicator axle, and the second fastening pin $p'$ see Fig. 1 of the bridge are screwed to zinc rods or supports which are also fastened to the brass ring. On account of this arrangement, the brass ring and the zinc rod must expand in opposite directions, at changes of temperature, whereby the tension in the bridge when the expansion of the latter is less than that of the brass, can easily be kept uniform, as the expansibility of zinc is greater than that of brass. In like manner the proper fastening pin for the conductor axis can be formed upon the zinc rod, which renders the instrument, in its indications absolutely independent of the surrounding atmosphere. In case the expansion of the bridge is greater than that of the brass, rods of less expansibility can be fastened to the brass ring for the purpose of keeping the tension of the bridge uniform. If several measuring wires are used, the same are fastened in like manner.

Having fully described our invention, what we claim, and desire to secure by Letters Patent, is—

1. In an electrical measuring instrument, a flexible body of conducting material extending between abutments, a second flexible body connected to a point on said first body and to an abutment and disposed at an angle to said first body, a means of applying strain at an angle to said second body to a point thereon between its abutment and its place of connection to said first body, and an indicating device showing the displacement of said point on said second body due to said strain when said first body is subjected to the action of electricity, substantially as set forth.

2. In an electrical measuring instrument the combination with the wire or wires heated by the electric current of a flexible thread or wire, which is fastened to a point or points between the terminals of said heat wire or wires and is bent by the expansion of the latter and in further combination with a second flexible thread or wire which connects a point between the terminals of the first thread with a weighted or spring actuated axle, over which the end of said second thread can be wound and which bears the indicator, substantially as described.

3. An electrical measuring instrument consisting of a wire or wires held between fixed supports and arranged to have an electric current traverse the same, in combination with a flexible connection or connections, a transmitting connection, an axle to which said transmitting connection is secured and an indicator secured to said axle, substantially as described.

4. In an electrical measuring instrument a current traversing wire or wires held between fixed supports, in combination with one or more flexible connections held taut and secured to the wire or wires intermediate of the supports, and a flexible transmitting connection connected to an indicator, substantially as described.

5. An electrical measuring instrument consisting of an indicator secured to an axle and impelled to turn in one direction by a weight or its equivalent, in combination with one or more flexible connections, a transmitting connection and a taut measuring wire or wires connected therewith, substantially as described.

6. In an electrical measuring instrument supports for conducting wire and indicator axle in combination with a ring to which they are secured, said ring being of a different metal from that of the supports, substantially as described.

7. In an electrical measuring instrument the current traversing wire or wires, the terminal or terminals of the same, their supporting rod or rods, and the indicator axle and its support in combination with the ring to which said supports are secured, said ring being of different metal from that of the supports, to compensate for changes in length of the wire due to changes in temperature of the atmosphere, substantially as described.

8. In an electrical measuring instrument zinc supports for the conducting wire and indicator axle in combination with a brass ring to which said supports are attached, substantially as described.

9. In an electrical measuring instrument, a terminal for the conducting wire of the same material as the wire, a zinc support for said terminal, an indicator axle support of zinc and a brass ring to which said supports are secured, substantially as described.

In testimony whereof we have signed our names to this specification in the presence of two subscribing witnesses.

EUGEN HARTMANN.
WUNIBALD BRAUN.

Witnesses:
JEAN GRUND,
FRANK H. MASON.